(12) United States Patent
Guy

(10) Patent No.: US 6,971,781 B2
(45) Date of Patent: Dec. 6, 2005

(54) REMOTE SOURCE LIGHTING

(75) Inventor: James K. Guy, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/803,248

(22) Filed: Mar. 18, 2004

(65) Prior Publication Data

US 2005/0207177 A1 Sep. 22, 2005

(51) Int. Cl.[7] .............................................. F21V 11/00
(52) U.S. Cl. ........................ 362/576; 362/559; 362/145
(58) Field of Search ............................... 362/576, 559, 362/145, 152

(56) References Cited

U.S. PATENT DOCUMENTS

| | | | | |
|---|---|---|---|---|
| 5,161,874 A | * | 11/1992 | Benes | 362/552 |
| 5,412,750 A | * | 5/1995 | Nath | 385/125 |
| 5,629,996 A | * | 5/1997 | Rizkin et al. | 385/31 |
| 5,986,792 A | * | 11/1999 | Rizkin et al. | 359/212 |
| 6,185,356 B1 | * | 2/2001 | Parker et al. | 385/133 |
| 6,612,729 B1 | * | 9/2003 | Hoffman | 362/551 |

* cited by examiner

Primary Examiner—Laura K. Tso
(74) Attorney, Agent, or Firm—Harness Dickey & Pierce P.L.C.

(57) ABSTRACT

A system and method for providing light generated at a location that is easily accessible by a person on the ground and channeling the light to a remote, difficult to access location where the light is directed toward an area desired to be illuminated. The lighting system includes an illumination device adapted to direct light toward the area to be illuminated and a light source located remotely from the illumination device. The light source is located such that it is easily accessible by a person standing on the ground. A light guide channels the light generated by the light source to the illumination device. Additionally, the light guide is adapted to be a structural component of the system for supporting the illumination device.

30 Claims, 6 Drawing Sheets

REMOTE SOURCE LIGHTING

FIELD OF INVENTION

The invention relates generally to lighting systems and more particularly to large lighting systems, such as street lamps, having a light generating source located remotely from an illumination device that directs light generated by the light source toward an area to be illuminated.

BACKGROUND OF THE INVENTION

Large lighting systems, such as street lamps, stadium light arrays, bill board lights, warehouse lights and other industrial/commercial lamps and lighting systems typically have a lighting source, e.g. a light bulb, located such that the light source is substantially difficult to access by a person standing on the ground. That is, the light source is generally located such that large complex equipment or machinery is required to assist a person in performing maintenance on the light source. For example, long extension poles are needed to replace the light source or lifting machinery is used to lift and/or position a person to provide access to the light source. For example, machinery or equipment is required to lift and/or position a person so that the light source, e.g. the light bulb, of a street lamp can be accessed. Thus, when maintenance of the light source is required, equipment or machinery needs to be put in place and used to complete the maintenance. Therefore, considerable expense, time and labor are incurred when access to the light source is required.

Additionally, use of such equipment, e.g. automated scaffolds, lift vehicles and ladders, creates hazardous situations that can put the person accessing the light source at risk of harm or injury. For example, when the light bulb, or other light source, of a street lamp requires maintenance, a lift truck is typically deployed to the location of the street lamp. The lift truck generally is parked in the street below the street lamp. A maintenance person typically enters a lift bucket and manipulates the bucket to lift him high in the air and in position to access the light source. This puts the maintenance person at risk of falling out of the lift bucket, contacting electrical lines, or being knocked out of the bucket if another vehicle collides with the lift truck. Furthermore, there is considerable cost incurred in deploying, storing, maintaining and stocking the lift truck, all of which are very costly. Still further, there is considerable time required to set up and position the lift truck once the truck reaches the maintenance location.

Therefore, it is desirable to have a lighting system that could substantially reduce the equipment costs, labor costs and risk issues that currently exist in the maintenance of large lighting systems.

BRIEF SUMMARY OF THE INVENTION

The present invention is directed to a system and method for providing light generated at a location that is easily accessible by a person on the ground and channeling the light to a remote, difficult to access location where the light is directed toward an area desired to be illuminated. Therefore, the present invention substantially reduces the equipment costs, labor cost and risks involved in maintaining current lighting systems.

Accordingly, in one preferred form, the present invention is a lighting system that includes an illumination device adapted to direct light toward an area to be illuminated. The system additionally includes a light source located remotely from the illumination device at a location that is easily accessible by a person standing on the ground. The light source generates the light emitted from the illumination device. The system further includes a light guide that channels the light generated by the light source to the illumination device. Additionally, the light guide is adapted to be a structural component of the system for supporting the illumination device.

In another preferred form, the present invention provides a method for illuminating a large area using a large overhead lighting system. The method includes generating light using a light source adapted to be easily accessible by a person standing on the ground. The light generated by the light source is channeled to an illumination device located remotely from the light source. The illumination device is generally located such that it is substantially difficult to access by a person standing on the ground. The light is channeled to the illumination device using a light guide that is also utilized as a structural component of the lighting system, e.g. a light pole. The method further includes directing the light toward an area to be illuminated using the illumination device.

Therefore, the present invention provides a lighting system and method that allows maintenance of the light source, e.g. replacing a light bulb, whereby the person providing the maintenance can easily access the light source without the need for equipment or machinery required to lift and/or position the maintenance person.

The features, functions, and advantages of the present invention can be achieved independently in various embodiments of the present inventions or may be combined in yet other embodiments.

BRIEF DESCRIPTION OF THE DRAWINGS

The present invention will become more fully understood from the detailed description and accompanying drawings, wherein.

Corresponding reference numerals indicate corresponding parts throughout the several views of drawings.

DETAILED DESCRIPTION OF THE INVENTION

The following description of the preferred embodiments is merely exemplary in nature and is in no way intended to limit the invention, its application or uses. Additionally, the advantages provided by the preferred embodiments, as described below, are exemplary in nature and not all preferred embodiments provide the same advantages or the same degree of advantages.

Figure 1:
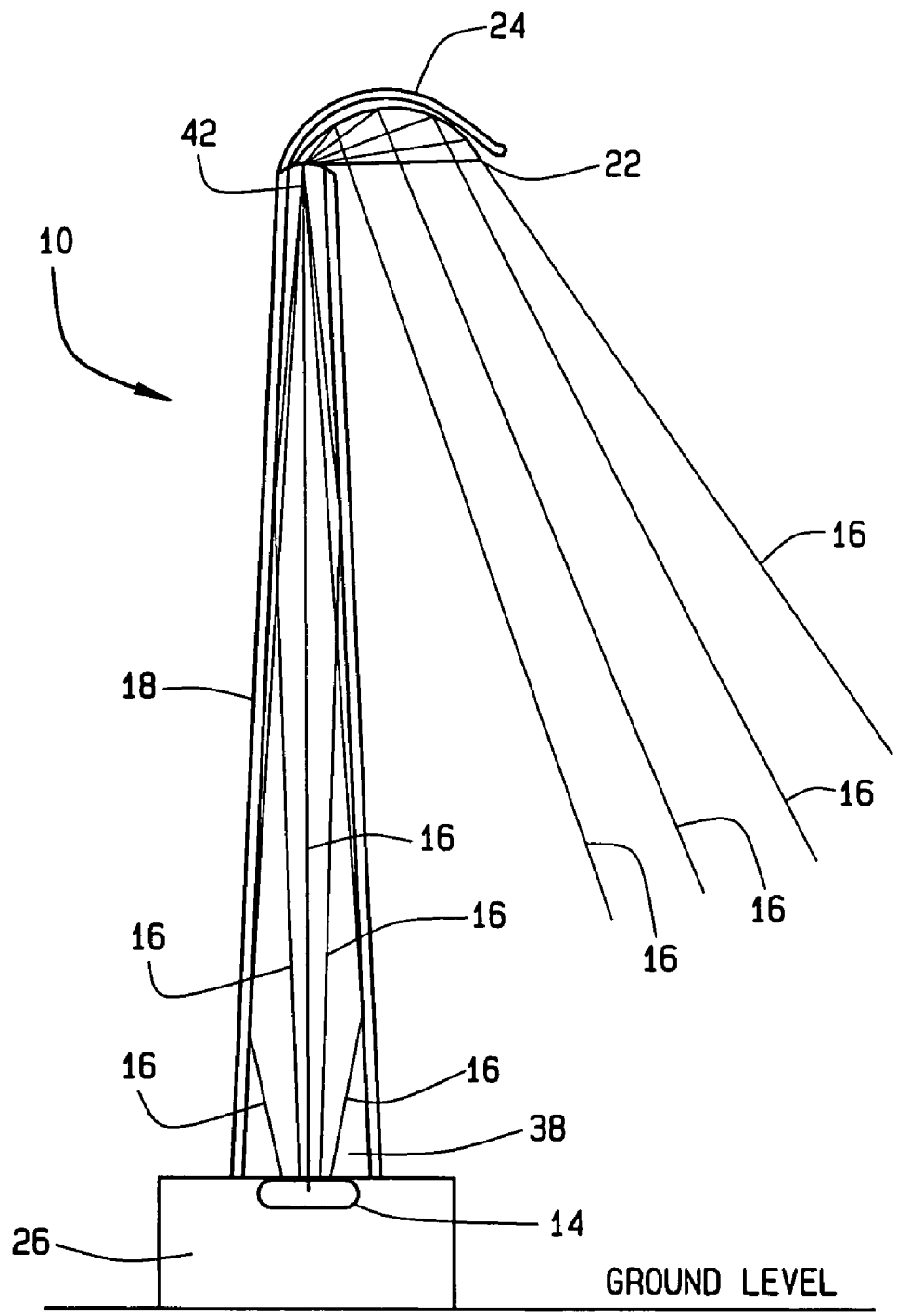
FIG. 1 is an illustration of a lighting system in accordance with a preferred embodiment of the present invention.

Referring to FIG. 1, a lighting system 10 is provided that allows easy access to a light source 14 without the need for large complex equipment or machinery to assist a person in performing maintenance on the light source 14. Generally only small hand tools, e.g. a screwdriver, pliers, volt meter, etc., are required to perform such maintenance. Therefore, considerable time, labor costs, equipment costs and risks of injury are substantially reduced when access to the light source 14 is required.

The light source 14 generates optical energy in the form of light signals 16, also referred to as light rays, that are directed in the general direction of a light guide 18. The light signals 16 are then channeled through the light guide 18 to an illumination device 22. The illumination device 22 directs the light signals 16 toward a desired area to be illuminated. The light source 14 is located remotely from the illumination device 22. More specifically, the light source 14 is generally located a substantial distance, e.g. several feet, from the illumination device 22. For example, the light source 14 is located substantially at ground level such that the light source 14 is accessible by a person standing on the ground, while the illumination device 22 may be located several feet away from, e.g. above, the light source 14 in a location substantially difficult to access by the person standing on the ground. In addition to channeling the light generated from the light source 14 to the illumination device 22, the light guide 18 is a structural component of the lighting system 10 that supports the illumination device 22. For example, in a scenario where the lighting system 10 is a street lamp, the light guide 18 is a lamp post adapted to support the illumination device 22 and to function as a light guide that transmits the light generated by the light source 14 to the illumination device 22.

The illumination device 22 can be any device suitable to redirect the light signals 16 channeled through the light guide 18 to the desired area to be illuminated. For example, the illumination device 22 could be a reflector, an optically refractive device, a combination of a reflector and optical refractor, or any other device suitable to bend, i.e. redirect, the light signals 16 to point them in a desired direction. In one preferred form, the illumination device 22 is a luminaire that utilizes total internal reflection (TIR) to redirect the light signals 16 toward the desired area to be illuminated. By utilizing TIR, the luminaire is very efficient at redirecting the light signals 16 to the desired area to be illuminated with very little light pollution. In a preferred embodiment, the illumination device 22 is protected by a hood 24 to protect the illumination device 22 from debris, dirt, rain or other potentially harmful environmental conditions.

In one preferred embodiment, the lighting system 10 includes a base 26 that is coupled to and supports the light guide 18. For example, if light guide 18 is a street lamp post, the base 26 would be anchored to the ground with the lamp post light guide 18 coupled to the base 26. It should also be noted that although the light guide 18 is shown in FIG. 1 to have a tapered shape, the light guide 18 can have any generally elongated shape suitable to channel the light generated by the light source 14 to the illumination device 22. For example, the light guide 18 can have a straight cylindrical, curved cylindrical or elongated elliptical shape.

Figure 2:
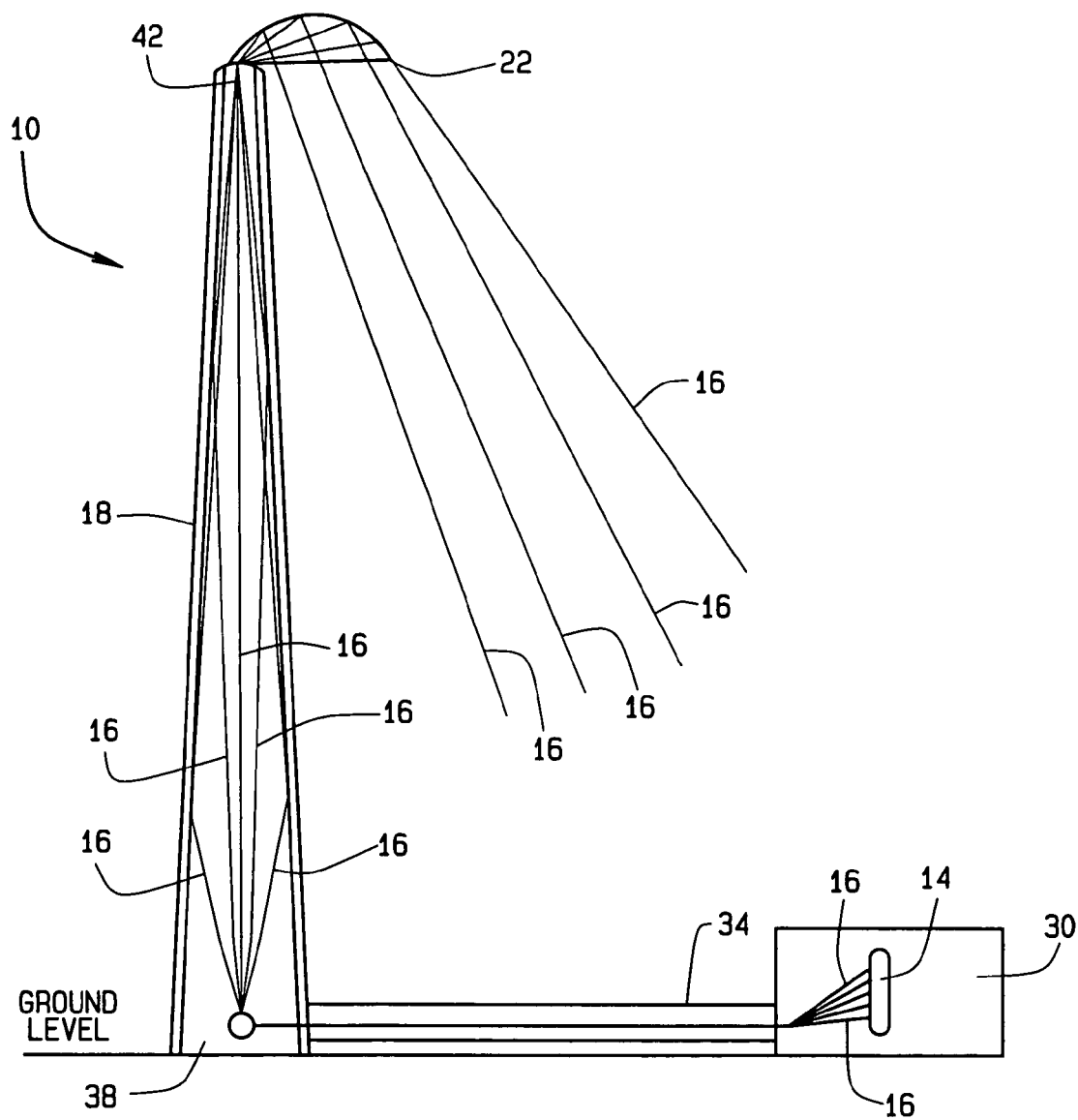
FIG. 2 is an illustration of a preferred alternate form of the lighting system shown in FIG. 1.

Referring to FIG. 2, in another preferred embodiment, the light source 14 is housed in a central control box 30 that is located remotely from the light guide 18. In this case, the lighting system 10 includes a light transmission conduit 34 for transmitting the light signals 16 generated by the light source 14 to a proximal end 38 of the light guide 18. The light transmission conduit 34 can be any suitable conduit for transmitting the light signals 16 from the light source 14 to the proximal end 38 of the light guide 18. For example, the transmission conduit 34 can be optical fiber located above or below the ground. The light guide 18 then channels the light signals 16 from the proximal end 38 to a distal end 42 of the light guide 18, where the illumination device 22 redirects the light signals 16 toward the area to be illuminated.

Figure 3:
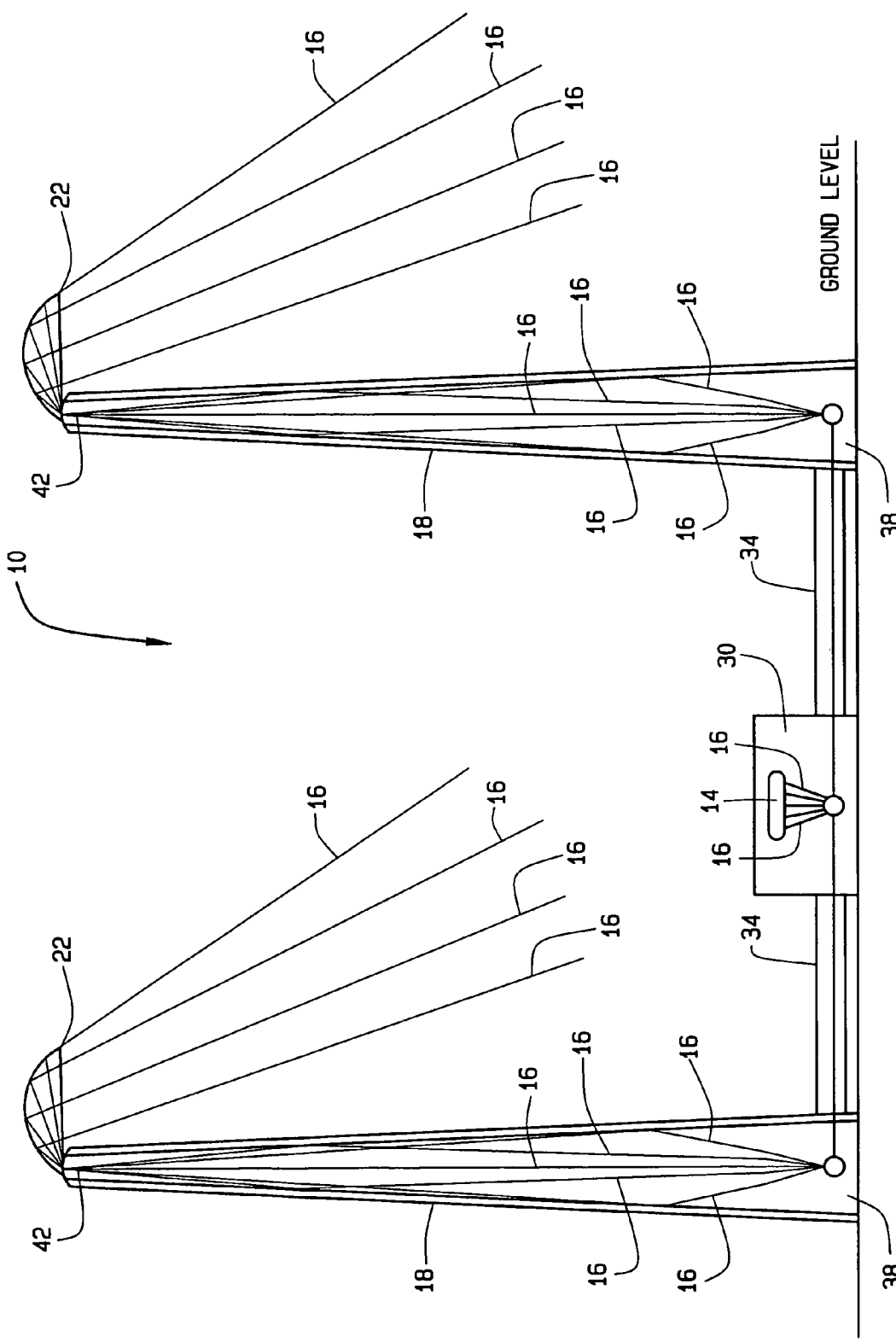
FIG. 3 is an illustration of another preferred alternate form of the lighting system shown in FIG. 1.

Referring to FIG. 3, in yet another preferred form, lighting system 10 includes a plurality of light guides 18 and associated illumination devices 22. As illustrated in FIG. 3, a single light source 14 generates light signals 16 that are transmitted from the light source 14 to the distal end 42 of each light guide 18. In order to generate sufficient light energy to provide light signals 16 to each light guide 18 and associated illumination devices 22 adequate to illuminate the desired areas, the light source 14 is a considerably large. For example, the light source 14 will include a large array of high wattage light bulbs or high intensity LEDs. The light energy generated by the large light source 14 is split and transmitted to proximal ends 38 of each light guide 18 via a plurality of transmission conduits 34. The light signals 16 are then channeled, via the light guide 18, to the associated illumination device 22 at the distal ends 42 of the light guides 18.

In one preferred embodiment the large light source 14 is located in a central control box 30 that is located remotely from each light guide 18. Alternatively, one of the plurality of light guides 18 can be coupled to a base 26 (shown in FIG. 1), wherein the large light source 14 is housed inside the base 26.

Figure 4:
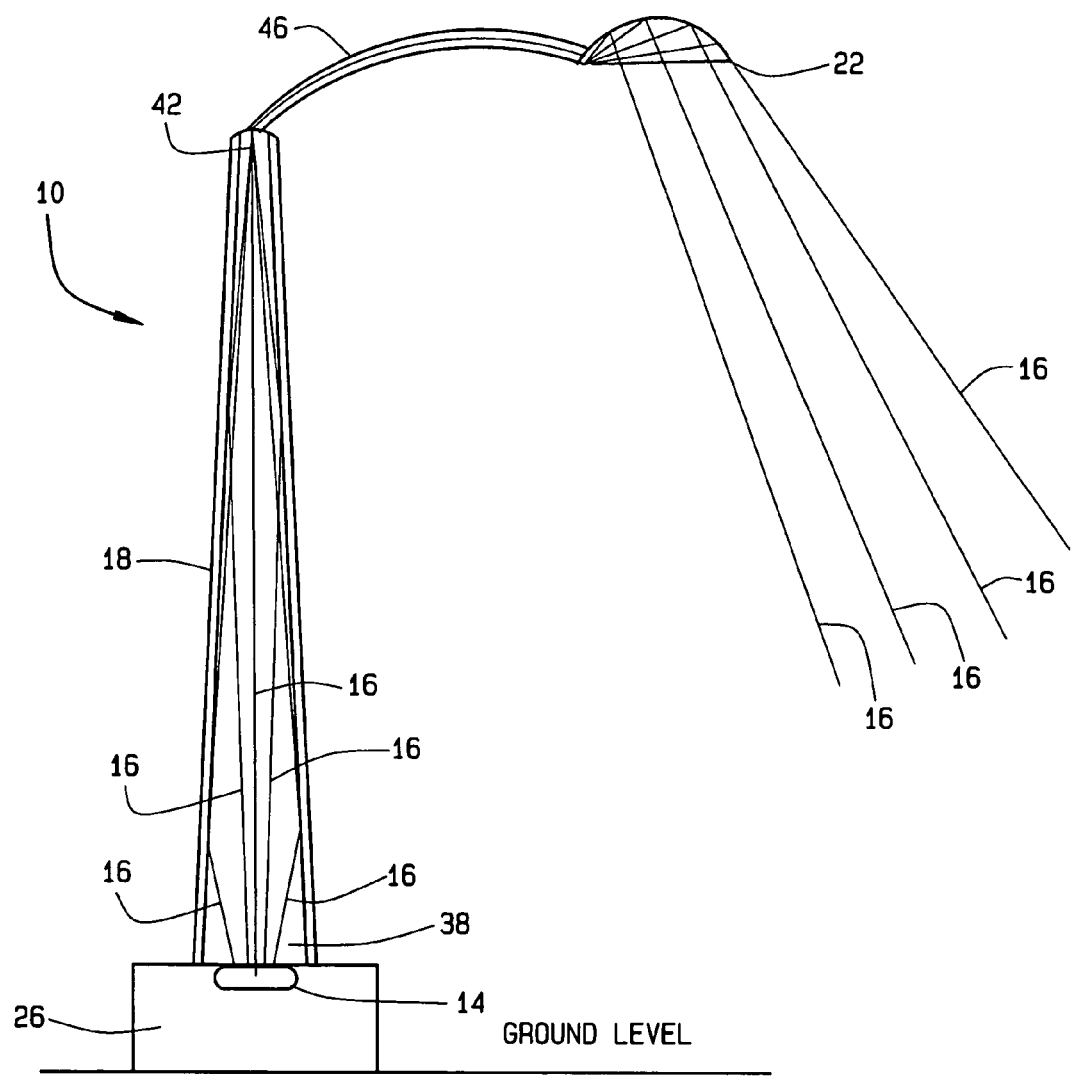
FIG. 4 is an illustration of yet another preferred alternate form of the lighting system shown in FIG. 1.

Referring now to FIG. 4, in another preferred embodiment of the lighting system 10 an extension arm 46 is coupled to the distal end 42 of the light guide 18. The light signals 16 emitted from the distal end 42 are transmitted through the extension arm 46 to the illumination device 22 that redirects, e.g. via TIR, the light signals 16 toward the area to be illuminated. The extension arm 46 includes any suitable means for transmitting the light signals 16 from the distal end 42 to the illumination device 22. For example, the extension arm 46 can be a second light guide substantially similar to the light guide 18, further described below, or the extension arm 46 can include at least one optical fiber.

Referring now to FIGS. 1–4, the light source 14 can be any light source suitable to generate the light signals 16. For example, the light source 14 can be an incandescent light bulb, a fluorescent light bulb, an arc lamp, a single light emitting diode (LED), an array of LEDs or a laser engine that generates a laser signal used to produce light signals 16. In one preferred form the light source 14 includes a reflector that generally focuses the generated light signals 16 in the direction of the light guide 18. Furthermore, as described above, the light guide 18 is a structural component of the lighting system 10 for supporting the illumination device 22. The light guide 18 can be any suitable structure adapted to channel the light signals 16 generated by the light source 14 from the proximal end 38 to the distal end 42.

Figure 5A:
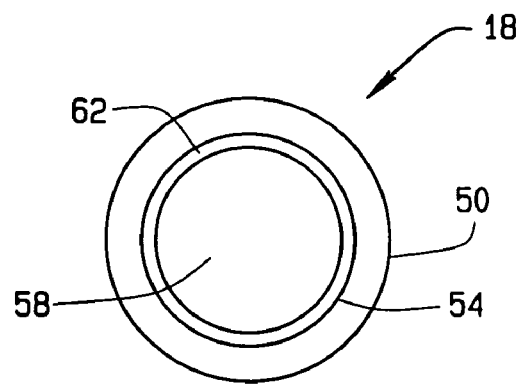
FIG. 5A is cross-sectional view of a light guide shown in FIG. 1, in accordance with a preferred embodiment of the present invention.

For example, in one preferred form, the light guide 18 is a hollow structure, as illustrated in a cross-sectional view of the light guide 18 shown in FIG. 5A. The hollow structure of the light guide 18 includes an outer surface 50, and inner surface 54 and a hollow portion 58. In a preferred form the inner surface 54 is covered with a highly reflective coating 62. In a preferred form, the light guide 18 is a thin walled hollow structure that provides sufficient structural strength to support the illumination device 22 in various extreme environments. Additionally, the thin walled structure is sufficiently thin such that it will collapse if impacted by a force exceeding a desired threshold, thereby reducing damage to an object that impacts the light guide 18. For example, if the light guide 18 is a lamp post, the thin walled lamp post will be constructed such that it will withstand the force of a hurricane but will collapse if struck by an automobile. Therefore, minimal damage to the automobile and minimal injury to the driver of the automobile will occur. Furthermore, the light guide 18 is coupled to the base 26 or the ground such that if damage occurs to the light guide 18, the light guide 18 is easily detached from the base 26 or the ground and replaced with a new light guide 18.

The reflective coating 62 reflects the light signals 16 from the proximal end 38 to the distal end 42 thereby channeling the light generated by the light source 14 to the illumination device 22. The reflective coating 62 can be any type of coating suitable to reflect the light signals 16 having relatively low grazing angles. For example, the reflective coating 62 can be a highly reflective white paint or any other highly reflecting substance that will reflect light signals 16 at low grazing angles from the proximal end 38 to the distal end 42 of the light guide 18.

Figure 5B:
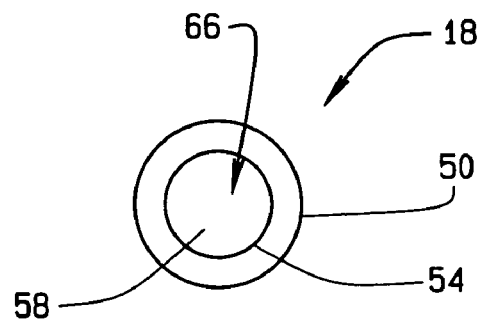
FIG. 5B is cross-sectional view of the light guide shown in FIG. 1, in accordance with another preferred embodiment of the present invention.

FIG. 5B illustrates another preferred embodiment of the light guide 18. In this embodiment the light guide 18 has a smaller diameter than light guide 18 shown in FIG. 5A and the hollow portion 58 includes a liquid waveguide core 66. The liquid waveguide core 66 channels the light signals 16 generated by the light source to the illumination device 22.

Figure 5C:
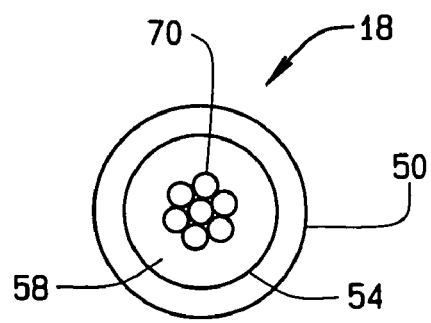
FIG. 5C is cross-sectional view of the light guide shown in FIG. 1, in accordance with yet another preferred embodiment of the present invention.

FIG. 5C illustrates yet another preferred form of the light guide 18, wherein the hollow portion 58 includes one or more optical fibers 70. The optical fibers 70 carry the light signal 16 from the proximal end 38 to the distal end 42 where they are redirected by the illumination device 22. In this embodiment it is envisioned that the light guide 18 may also have a reduced diameter relative to the light guide 18 illustrated in FIG. 5A.

Figure 6:
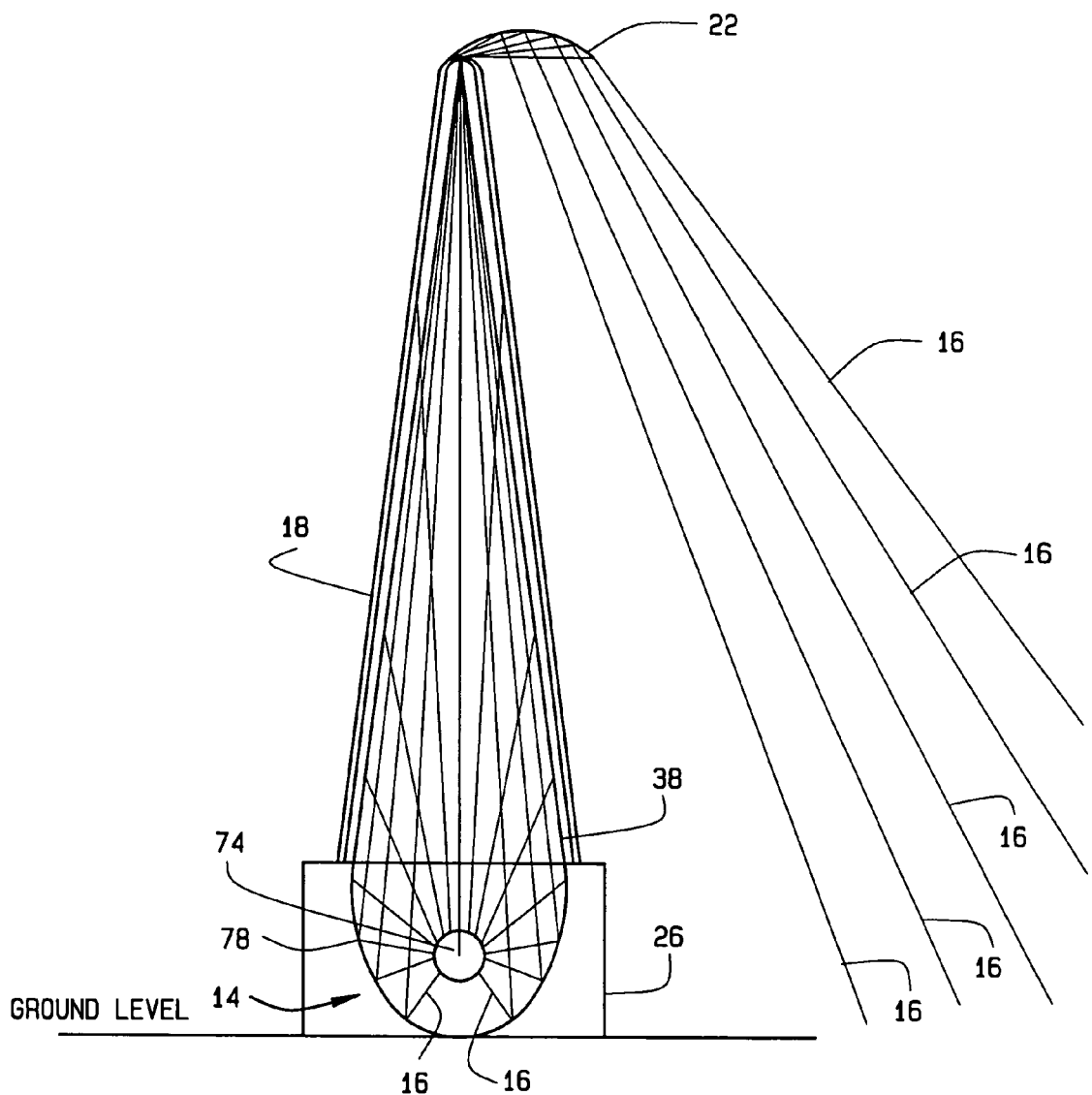
FIG. 6 is an illustration of a preferred embodiment of a light source shown in FIG. 1.

Referring to FIG. 6, in one preferred form the light source 14 includes a light emitting device 74, such as a light bulb or LED, and conic reflector 78. The light emitting device 74 emits the light signals 16 in all directions. That is, some light signals 16 emitted may be directed toward the proximal end 38 of the light guide 18 while other light signals 16 emitted may be directed away from the proximal end 38. The conic reflector 78 is formed to have an outer shape suitable to reflect the light signals 16 that are emitted by the light emitting device 74 in directions away from the proximal end 38 back toward the proximal end 38 of the light guide 18. For example, the conic reflector 78 can be formed to resemble substantially one half of an ellipse, an off axis paraboloid or any other conic shape suitable to focus or collimate the light signals 16 toward the proximal end 38 of the light guide 18. The light signals 16 are then channeled through the light guide 18 to the illumination device 22, as described above.

The lighting system 10 generates light signals 16 utilizing a light source 14 that is easily accessible by a person standing on the ground without the need for large, expensive, complex, hazardous machinery or equipment. The light signals 16 are channeled to the illumination device 22 via the light guide 18. The illumination device 22 then redirects the light signals 16 toward a desired area to be illuminated. The light guide 18 further serves as a structural member of the lighting system 10 that supports the illumination device 22 in a desired location that is generally difficult to access by a person standing on the ground. Therefore, the present invention provides an easily maintainable lighting system that substantially reduces the equipment costs, labor costs and risks that currently exist in maintenance of known large lighting systems.

While the invention has been described in terms of various specific embodiments, those skilled in the art will recognize that the invention can be practiced with modification within the spirit and scope of the claims.

What is claimed is:

1. A lighting system, comprising:
   an illumination device adapted to direct light toward an area to be illuminated;
   a light source located remotely from the illumination device and adapted to generate the light; and
   a light guide adapted to channel the light generated from the light source to the illumination device, wherein the light guide comprises a hollow structure having a reflective coating covering an inside surface of the structure and is a structural component of the system for supporting the illumination device a distance away from the light source.

2. The system of claim 1, wherein the light guide comprises a street lamp post.

3. The system of claim 1, wherein the light source is adapted to be located remotely from the light guide.

4. The system of claim 1, wherein the light source is adapted to be located within a base adapted to support the light guide.

5. The system of claim 1, wherein the light source comprises at least one laser engine.

6. The system of claim 1, wherein the light source comprises at least one light bulb.

7. The system of claim 1, wherein the light source comprises at least one light emitting diode (LED).

8. The system of claim 1, wherein the system further comprises a plurality of light guides, each having an associated illumination device, wherein the light source is adapted to generate light channeled by each light guide to the respective associated illumination devices.

9. The system of claim 1, wherein the hollow structure includes a liquid waveguide core.

10. The system of claim 1, wherein the system further comprises an arm extending from a distal end of the light guide, the arm adapted to channel light from the light guide to the illumination device connected the arm.

11. A method for illuminating a large area using a large overhead lighting system, said method comprising:
   generating light using a light source adapted to be easily accessible by a person standing on the ground;
   channeling the light to an illumination device located above the light source in a location that is substantially difficult to access by a person standing on the ground, using a light guide comprising a hollow structure with a reflective coating covering an inside surface of the hollow structure that functions as a structural component of the lighting system to support the illumination device above the light source; and
   directing the light toward an area to be illuminated using the illumination device.

12. The method of claim 11, wherein channeling the light comprises utilizing a street lamp post as the light guide.

13. The method of claim 11, wherein generating light comprises locating the light source remotely from the light guide.

14. The method of claim 11, wherein generating light comprises locating the light source in a base adapted to support the light guide.

15. The method of claim 11, wherein generating light comprises generating light signals using at least one laser engine.

16. The method of claim 11, wherein generating light comprises illuminating at least one light bulb.

17. The method of claim 11, wherein generating light comprises activating at least one light emitting diode (LED).

18. The method of claim 11, wherein the method further comprises channeling the light to a plurality of illumination devices located remotely from the light source in locations substantially difficult to access by a person standing on the ground, using a plurality of associated light guides.

19. The method of claim 11, wherein channeling the light comprises providing a liquid waveguide core within a hollow portion of the hollow structure.

20. A light source adapted to generate light and to be easily accessible by a person standing on the ground;
 a lamp post comprising a hollow structure having a reflective coating covering an inside surface of the post such that the lamp post is adapted to be a light guide for channeling the light generated by the light source, and
 a luminaire supported by the light guide lamp post in a position remote from the light source and adjacent a distal end of the lamp post, the luminaire adapted to redirect the light channeled through the lamp post.

21. The street lamp of claim 20, wherein the light source is adapted to be located remotely from the lamp post.

22. The street lamp of claim 20, wherein the light source is adapted to be located within a base adapted to support the lamp post.

23. The street lamp of claim 20, wherein the light source comprises at least one of a laser engine, a light bulb and a light emitting diode (LED).

24. The street lamp of claim 20, wherein the hollow structure includes a liquid waveguide core.

25. The street lamp of claim 20, wherein the system further comprises an arm extending from the distal end of the lamp post, the arm adapted to channel light channeled by the lamp post to the illumination device connected the arm.

26. The street lamp of claim 20, wherein the luminaire redirects the light channeled through the lamp post via total internal reflection (TIR).

27. A lamp system comprising:
 at least one light source adapted to generate the optical signals and be easily accessible by person standing on the ground; and
 at least one lamp post optically coupled to the light source, the lamp post comprising a hollow structure having a reflective coating covering an inside surface of the post adapted to channel the optical signals;
 at least one luminaire supported by the lamp post in a location above the light source substantially difficult to access by a person standing on the ground, wherein the luminaire is adapted to receive the optical signals channeled by the lamp post and direct optical signals toward an area to be illuminated.

28. The lamp system of claim 27, wherein the light source is adapted to be located remotely from the lamp post.

29. The lamp system of claim 27, wherein the light source is adapted to be located within a base adapted to support one lamp post.

30. The street lamp of claim 27, wherein the lamp post comprises a hollow structure having a liquid waveguide core.

* * * * *